March 29, 1932. R. G. COATES 1,851,274

MECHANISM FOR OPERATING CLUTCHES AND BRAKES

Filed March 15, 1930

Inventor

Ray G. Coates

Patented Mar. 29, 1932

1,851,274

UNITED STATES PATENT OFFICE

RAY G. COATES, OF PASADENA, CALIFORNIA

MECHANISM FOR OPERATING CLUTCHES AND BRAKES

Application filed March 15, 1930. Serial No. 436,079.

My invention belongs to that class of motor car auxiliaries in which the operator of the car controls the application of power to do work formerly performed by the operator himself, and more particularly to that subclass of such devices in which efforts of the operator less than the maximum effort are proportionally followed by the auxiliary.

My invention relates especially to the means of applying low fluid pressure to the operation of brakes and clutches of motor cars, and particularly of motor cars driven by internal combustion engines in which the intake manifold of such engines affords a gratuitous means of obtaining the low pressure needed. As is common in this class of devices my invention does not interfere with the usual practice in controlling a car.

The drawings show my invention as attached to a clutch controlling member. This is not to be construed as a limitation but simply as a means of illustration of my invention. It may also be applied to a brake controlling member.

Figure 1:
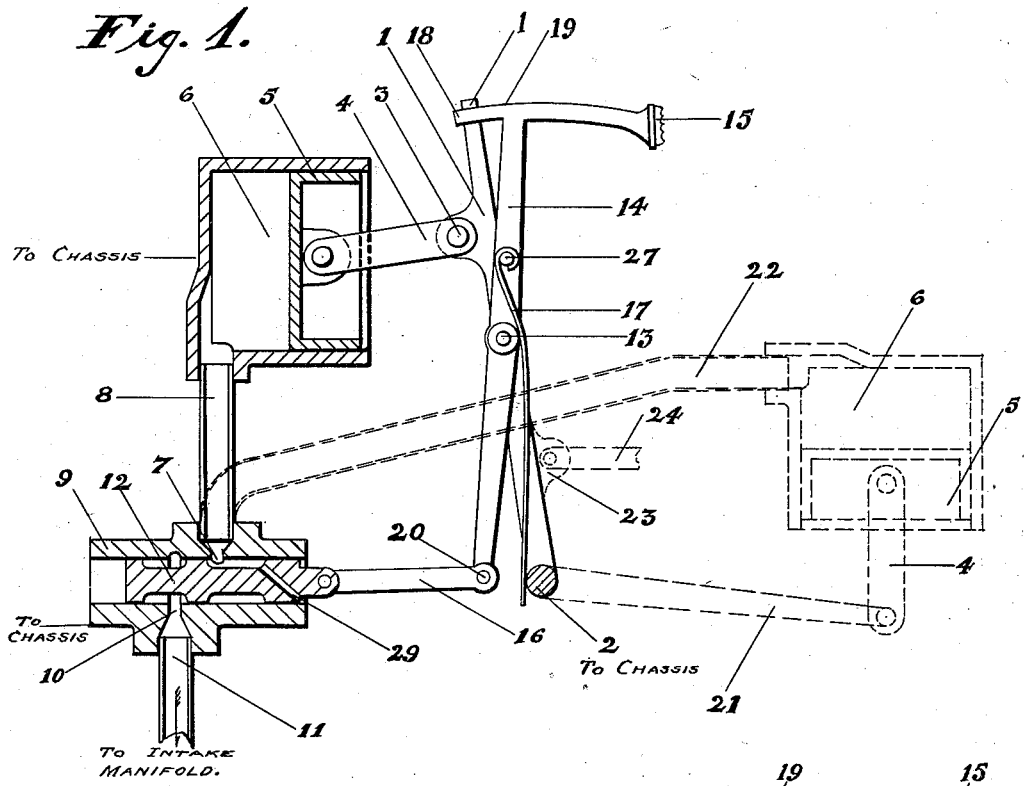
Figure 3:
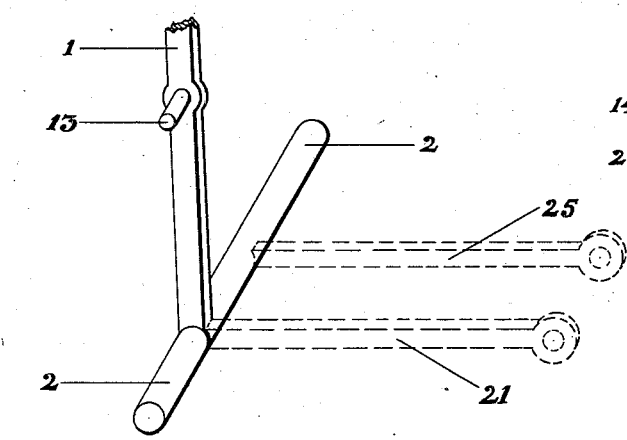
Figure 2:
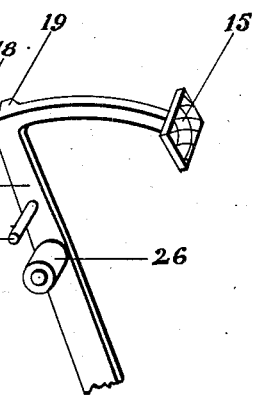

In the drawings Figure 1 represents a diagrammatical side view, partly in section; Figure 2 an angular broken view of a part of Figure 1; Figure 3 a diagrammatical broken view explaining variations.

In the drawings member 1 represents what is usually the clutch controlling lever which commonly carries a pedal, the latter, however, is not necessary on this member in my improvement. The fulcrum 2 of this controlling lever is secured in suitable bearings to the chassis or engine foundation, not shown, so that the relative positions of the clutch and 2 will remain as designed. To the upper end of 1 is movably attached, by a suitable connection 3, the connecting rod 4 whose other end is movably secured to the piston 5, which latter closes the otherwise open end of cylinder 6. The cylinder 6 is fixed, directly or indirectly, to the same structure as is the fulcrum 2 so that the designed relative positions of these members will be maintained. By means of a port 7 and conduit 8 the cylinder 6 is connected to a valve body 9, which latter also carries a port 10 which connects through a conduit 11 with a source of suction, as, for instance, the intake manifold of the engine of the car. A valve 12 is placed in the valve body 9 which permits the cylinder 6, via the conduit 8 and port 7 to be connected to the atmosphere through the vent 29 by moving the valve to the left, or by moving it to the right to cut off the atmosphere and connect port 7 to port 10 and thus to a source of suction. The movement of valve 12 is at no time to open the port 10 and the conduit 11 to the atmosphere. The valve 12 is to be given enough lap over the cutting off edges of the port 7 to allow the cylinder 6 to be cut off from both the atmosphere and the port 10 so that there will be a short portion of the valve stroke in which partial pressures may remain in cylinder 6.

Fulcrumed on 1 at 13 is a lever 14, carrying a pedal 15 at its upper end and a connecting rod 16 at its lower end. In order that lever 14 may not have any undesirable lateral movement the bearing on fulcrum 13 may be made long enough, through the use of a hub 26, to secure lateral stability, as shown in Figure 2. A spring 17, strong enough to move the pedal 15 away from the upper end of lever 1, is secured to a pin 27 projecting from the side of 14, which spring, by pressing against the hub 26 of fulcrum 13 and also against fulcrum 2, reacts between the members 1 and 14 and thus keeps 14 against a limiting stop 18, which latter prevents 17 from moving the upper end of 14 too far to the right. The left hand end of rod 16 is flexibly connected to the valve 12.

The normal position of valve 12 leaves port 7 cut off from port 10 and open to the atmosphere through vent 29 and the right hand end of valve body 9. The normal position of the lever 14 is with the stop 18 in contact with lever 1. The connecting rod 16 is to be of such length as to connect 14 to 12 when lever 14 and valve 12 are in the above mentioned normal positions.

If the lever 14 is moved to the left sufficiently a stop 19 on lever 14 will contact with lever 1 and any farther movement of 14 to the left will carry lever 1 with it and the clutch will open by the pressure of the foot of the operator in case the engine is not running. If the engine is running, as the pedal lever is moved to the left and before stop 19 contacts with lever 1 the lower end of 14 moves to the right, the lever 14 turning around the fulcrum 13. This carries rod 16 and valve 12 to the right also thus cutting off the atmosphere from cylinder 6 and opening the latter, via ports 7, 10, and conduit 11 to the source of suction, and the atmospheric pressure then moves piston 5, connecting rod 4 and lever 1 and begins to open the clutch. As lever 1 moves to the left fulcrum 13 moves with it and since spring 17 reacts against the foot of the operator and the latter does not move therefore the lower end of 14 moves to the left with the fulcrum 13. In this manner rod 16 and valve 12 move to the left and cut off port 7 from port 10 and prevent further loss of pressure in cylinder 6 while the pedal 15 remains stationary. If the operator continues to press pedal 15 forwards after the clutch has started to open, and thus follows the retreating controlling lever 1 as the latter is moved to the left by the piston 5, then the lower end of lever 14 will not move the connecting rod 16 and valve 12 to the left, therefore valve 12 will maintain communication between the cylinder 6 and the conduit 11 and a full clutch opening will result. When the stop 19 is in contact with the controlling lever 1 the point 20 of lever 14 is close to the fulcrum 2 and the distance 20—2 is therefore a short one. The line, prolonged, joining the end connections of rod 16 should approximately intersect the axis of fulcrum 2 when the piston has completed the major part of its inward stroke, at which time also the said line should be at approximately a right angle with the lever arm 20—13 of the pedal lever 14. Under these conditions the valve 18 is moved chiefly by the relative movements between levers 14 and 1 and the effects on the valve of their joint movements may be ignored.

If the lever arm from fulcrum 13 to pedal 15 is the same length as that from 13 to 20 then the valve 12 will move practically the same stroke as is permitted pedal 15 by the stops 18 and 19. If the fulcrum 13 is located nearer the pedal then the valve 12 will move more than the pedal. The sensitiveness of response of the valve 12 to pedal pressure may thus be controlled by these two lever arms in conjunction with the details of the valve. In proportioning valve 12 a short interval in which cylinder 6 is cut off from both atmospheric and vacuum pressures is readily provided by the lap of the valve over port 7, a matter well understood by those experienced in this art. This interval permits pressures to stand in cylinder 6 at various pressures greater than the minimum. The stops 18 and 19 are to be so placed as to permit the desired stroke to valve 12. The valve 12 is shown as a piston valve. I do not confine myself to this particular form of valve but contemplate using any form of valve now known that is suitable for this purpose.

As shown in Figure 1 the cylinder 6 is placed forward of the clutch-controlling lever 1. The design of some motor cars leaves too little room for this position of the cylinder. Cylinder 6 may be in any convenient position which allows the piston 5 to connect to and move the controlling lever 1, or an extension from the fulcrum 2. Such other location, of the many possible ones, is diagrammatically shown by the dotted right hand additions of Figure 1. Here the cylinder is below the floor of the car and the piston 5 is connected by the rod 4 to a dotted extension 21 from the base of the lever 1, and the valve body is connected by the dotted conduit 22, as shown in Figure 1. It is common in motor car design for the element 2 to be a shaft transverse the car and turning in bearings directly or indirectly attached to the chassis. If an extension 21 is desired such extension need not be in the plane of lever 1. It may be extended from any desired point along 2 that will place the cylinder in a convenient location. This is shown diagrammatically in Figure 3 where the extension 25 moves in a plane parallel to the plane containing the path of lever 1.

It is common in this art to connect the piston to the part to be actuated by a flexible connection, instead of the solid connecting rod 5 shown in the drawings. Such a construction allows the piston to remain unmoved when the controlling lever is moved by the operator at such times as the engine is not running. The connection 5 is merely a diagrammatic one. I contemplate using any of the known forms of connection that are now used in this art.

Instead of lever 1 being considered as a part of the clutch system it may be considered as the governing member of the brake system. In this case a lug, 23, on the lever 1, shown dotted, may be connected to a connecting rod, 24, also dotted, which latter is a part of the brake system. The brake is applied in the usual manner by the pedal 15. The first effect is to move the valve 12 to the right which causes piston 5 to move controlling lever 1 to the left and thus apply pressure to the brakes through the tension connection 24. If the pedal remains in the position to which it was first moved the movement of lever 1 to the left, as previously described, will move valve 12 to the left and thus stop the increase of pressure on the brakes. If pedal 15 is depressed farther increased pressure will accumulate on piston 5 and thus on the brakes. If pedal 15 is depressed so as to follow the retreating lever 1 then maximum pressure will immediately result on the brakes. For brake purposes partial pressures are desirable. The different positions of fulcrum 13 as lever 1 moves through its full arc of movement, due to various pressures on the pedal 15, represent various possible pressures on the brakes. The application of the brakes is automatically accomplished by the car operator with merely the small effort required to overcome the weak spring 17, and this force should be only a small fraction of the force required to operate the brakes in the usual way. To return the piston to "released position" of the brakes, after pressure has been removed from the pedal, dependence may be had on the usual releasing springs at the brakes themselves with the resulting tension on the connection 24, or a spring may be placed in any suitable position so as to move piston 5 to the "brakes released" position. Since the use of springs to release the pistons of air brakes has been practiced for many years no further description of this point is considered necessary. It will be evident that the continued movement of the pedal lever 14 to the left will carry lever 1 with it and that the brakes will thus be applied by foot power, in the usual manner, if the engine is not running.

I claim:

In a vacuum operated motor the combination of the controlling lever fulcrumed around a center, a piston, a cylinder in which said piston moves closed at the end in advance of the piston, means to operatively connect said piston to said controlling lever, a conduit connecting said cylinder with a source of suction, a pedal lever provided with a pedal at one end and a fulcrum on said controlling lever and having a limited angular movement around said fulcrum, a yielding means for maintaining said pedal lever in a released position, a valve in said conduit, a connection between said valve and the other end of said pedal lever said connection having the line passing through its end connections approximately intersecting the said center and approximately at right angles with the lower lever arm of said pedal lever when said piston has completed the major part of its inwards stroke and at which time the distance between the said center and the point of connection with the lower end of said pedal lever is a short one, said valve being adapted to admit atmospheric pressure to said cylinder and to cut off from said cylinder the source of suction when said pedal lever is released and to cut off atmospheric pressure from said cylinder and to open communication between said cylinder and said source of suction when said pedal lever is depressed.

RAY G. COATES.